(12) United States Patent
Osawa et al.

(10) Patent No.: US 11,524,529 B2
(45) Date of Patent: Dec. 13, 2022

(54) TIRE

(71) Applicant: Sumitomo Rubber Industries, Ltd., Kobe (JP)

(72) Inventors: Takuya Osawa, Kobe (JP); Teppei Nakamichi, Kobe (JP); Kensuke Aizawa, Kobe (JP); Daichi Takatsuki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 152 days.

(21) Appl. No.: 16/950,398

(22) Filed: Nov. 17, 2020

(65) Prior Publication Data
US 2021/0146729 A1 May 20, 2021

(30) Foreign Application Priority Data

Nov. 18, 2019 (JP) ............................. JP2019-208061

(51) Int. Cl.
| | |
|---|---|
| *B60C 11/13* | (2006.01) |
| *B60C 11/03* | (2006.01) |
| *B60C 11/12* | (2006.01) |

(52) U.S. Cl.
CPC .......... *B60C 11/13* (2013.01); *B60C 11/0309* (2013.01); *B60C 11/1204* (2013.01);
(Continued)

(58) Field of Classification Search
CPC . B60C 11/13; B60C 11/0309; B60C 11/1204; B60C 2011/0341;
(Continued)

(56) References Cited

U.S. PATENT DOCUMENTS

2014/0305559 A1* 10/2014 Takemoto ........... B60C 11/0304
152/209.8
2015/0375571 A1* 12/2015 Koishikawa .............. B60C 5/00
152/209.18
(Continued)

FOREIGN PATENT DOCUMENTS

| EP | 3 153 334 A1 | 4/2017 |
|---|---|---|
| EP | 3 162 593 A1 | 5/2017 |

(Continued)

OTHER PUBLICATIONS

Extended European Search Report for European Application No. 20206068.7, dated Mar. 31, 2021.

*Primary Examiner* — Alison L Hindenlang
*Assistant Examiner* — Shibin Liang
(74) *Attorney, Agent, or Firm* — Birch, Stewart, Kolasch & Birch, LLP (57) ABSTRACT

The tire has a tread portion axially divided into two shoulder land regions, two middle land regions and one crown land region by two shoulder circumferential grooves and two crown circumferential grooves. The middle land regions are each provided with a single longitudinal sipe, and first and second middle transverse grooves extending from the adjacent shoulder circumferential groove and crown circumferential groove, and terminated without being connected to the longitudinal sipe. The shoulder land regions are each provided with shoulder transverse grooves extending from tread edges and terminated within the respective shoulder land regions.

16 Claims, 9 Drawing Sheets

(52) U.S. Cl.
CPC ............... *B60C 2011/0341* (2013.01); *B60C 2011/1227* (2013.01)

(58) Field of Classification Search
CPC . B60C 2011/1227; B60C 11/00; B60C 11/03; B60C 11/0304; B60C 11/1236; B60C 11/0306

See application file for complete search history.

(56) References Cited

U.S. PATENT DOCUMENTS

| | | | | |
|---|---|---|---|---|
| 2017/0100965 | A1* | 4/2017 | Kikuchi | .............. B60C 11/1263 |
| 2019/0359007 | A1* | 11/2019 | Uemura | .............. B60C 11/1236 |
| 2020/0122517 | A1* | 4/2020 | Taniguchi | ........... B60C 11/1236 |

FOREIGN PATENT DOCUMENTS

| | | |
|---|---|---|
| EP | 3 424 751 A1 | 1/2019 |
| EP | 3 611 039 A1 | 2/2020 |
| JP | 2015-168356 A | 9/2015 |

\* cited by examiner

TIRE

TECHNICAL FIELD

The present invention relates to a tire, more particularly to a tread pattern for a tire of which tread portion is axially divided into five land regions.

BACKGROUND ART

The following patent document 1 discloses a tire having a tread portion axially divided into five land regions, wherein the arrangement of tread grooves is improved in order to improve steering stability.
Patent Document 1: Japanese Patent Application Publication No. 2015-168356

SUMMARY OF THE INVENTION

Problems to be Solved by the Invention

In recent years, as the performance of automobiles is remarkably improved, the tires therefor are required to exert good steering stability. However, depending on the arrangement of tread grooves, there is a possibility that the ride comfort performance deteriorates as the steering stability is improved.

It is therefore, an object of the present invention to provide a tire of which tread portion is axially divided into five land regions, and in which the steering stability is improved without sacrificing the ride comfort performance.

According to one aspect of the present invention, a tire comprises:
a tread portion provided with four circumferential grooves extending continuously in the tire circumferential direction to axially divide the tread portion into five land regions,
the four circumferential grooves including two shoulder circumferential grooves, and two crown circumferential grooves therebetween,
the five land regions including two shoulder land regions between the two shoulder circumferential grooves and tread edges, two middle land regions between the shoulder circumferential grooves and the crown circumferential grooves, and one crown land region between the two crown circumferential grooves,
wherein each of the two middle land regions is provided with
a longitudinal sipe extending continuously in the tire circumferential direction,
first middle transverse grooves each extending from the adjacent crown circumferential groove and terminated within the middle land region without being connected to the longitudinal sipe therein, and
second middle transverse grooves extending from the adjacent shoulder circumferential groove and terminated within the middle land region without being connected to the longitudinal sipe therein, and
each of the two shoulder land regions is provided with shoulder transverse grooves extending from the adjacent tread edge and terminated within the shoulder land region.

In this application including the specification and claims, the term "sipe" means a vary narrow groove having a groove width of not more than 1.5 mm inclusive of a cut having no substantial width.

The tire according to the present invention may have a mounting position on a vehicle specified such that the tread edges are an outboard tread edge to be positioned away from a center of a vehicle body and an inboard tread edge to be positioned close to the center of the vehicle body, therefore,
the two shoulder land regions are an outboard shoulder land region extending axially inwardly from the outboard tread edge, and an inboard shoulder land region extending axially inwardly from the inboard tread edge, and
the two middle land regions are an outboard middle land region adjacent to the outboard shoulder land region, and an inboard middle land region adjacent to the inboard shoulder land region.

It is preferable that the width in the tire axial direction of the outboard shoulder land region is greater than the width in the tire axial direction of the outboard middle land region.

It is preferable that the width in the tire axial direction of the outboard middle land region is greater than the width in the tire axial direction of the crown land region.

It is preferable that the width in the tire axial direction of the crown land region is greater than the width in the tire axial direction of the inboard middle land region.

It is preferable that the width in the tire axial direction of the inboard middle land region is greater than the width in the tire axial direction of the inboard shoulder land region.

It is preferable that the width in the tire axial direction of the outboard shoulder land region is between 101% and 107% of the width in the tire axial direction of the crown land region.

It is preferable that the width in the tire axial direction of the inboard shoulder land region is in a range from 93% to 99% of the width in the tire axial direction of the crown land region.

It is preferable that a circumferential rigidity of the outboard shoulder land region is greater than a circumferential rigidity of the outboard middle land region which is greater than a circumferential rigidity of the crown land region which is greater than a circumferential rigidity of the inboard middle land region.

It is preferable that the groove width of the shoulder circumferential groove is less than the groove width of the crown circumferential groove.

It is preferable that the groove width of the shoulder circumferential groove is in a range from 93% to 99% of the groove width of the crown circumferential groove.

It is preferable that the crown land region is provided with crown sipes extending across the entire width of the crown land region.

According to another aspect of the present invention, a tire comprises:
a tread portion provided with four circumferential grooves extending continuously in the tire circumferential direction to axially divide the tread portion into five land regions,
the four circumferential grooves including two shoulder circumferential grooves, and two crown circumferential grooves therebetween,
the five land regions including two shoulder land regions between the two shoulder circumferential grooves and tread edges, two middle land regions between the shoulder circumferential grooves and the crown circumferential grooves, and one crown land region between the two crown circumferential grooves,
wherein each of the two middle land regions is provided with
a longitudinal sipe extending continuously in the tire circumferential direction,
first middle sipes each extending from the adjacent crown circumferential groove and terminated within the middle land region without being connected to the longitudinal sipe therein, and second middle sipes extending from the adjacent shoulder circumferential groove and terminated within the middle land region without being connected to the longitudinal sipe therein, and each of the two shoulder land regions is provided with shoulder transverse grooves extending from the adjacent tread edge and terminated within the shoulder land region.

It is preferable that the first middle sipes are provided with first chamfers extending to ground contacting top surfaces of the respective middle land regions.

It is preferable that each of the first middle sipes is provided, at its both edges on both sides in the tire circumferential direction, with first chamfers extending to a ground contacting top surface of the middle land region where said each of the first middle sipe is disposed.

It is preferable that the second middle sipes are provided with second chamfers extending to ground contacting top surfaces of the respective middle land regions.

It is preferable that each of the second middle sipes is provided, at its both edges on both sides in the tire circumferential direction, with second chamfers extending to a ground contacting top surface of the middle land region where said each of the second middle sipe is disposed.

Therefore, in the tire according to the present invention, the longitudinal sipe moderately mitigates the rigidity in the tire axial direction of the middle land region, while maintaining the rigidity in the tire circumferential direction of the middle land region. Thereby, the ride comfort is improved. Further, since the first middle transverse grooves and the second middle transverse grooves are terminated within the middle land region without being connected to the longitudinal sipe, the ride comfort is improved while maintaining the rigidity in the tire circumferential direction of the middle land region.

Further, the two middle land regions whose rigidity in the tire circumferential direction is maintained, can help to improve the steering stability.

Furthermore, the two shoulder land regions provided with the shoulder transverse grooves extending from the respective tread edges and terminated within the respective shoulder land regions, can provide excellent steering stability while maintaining the ride comfort.

DESCRIPTION OF THE PREFERRED EMBODIMENTS

Embodiments of the present invention will now be described in detail in conjunction with accompanying drawings.

Figure 1:
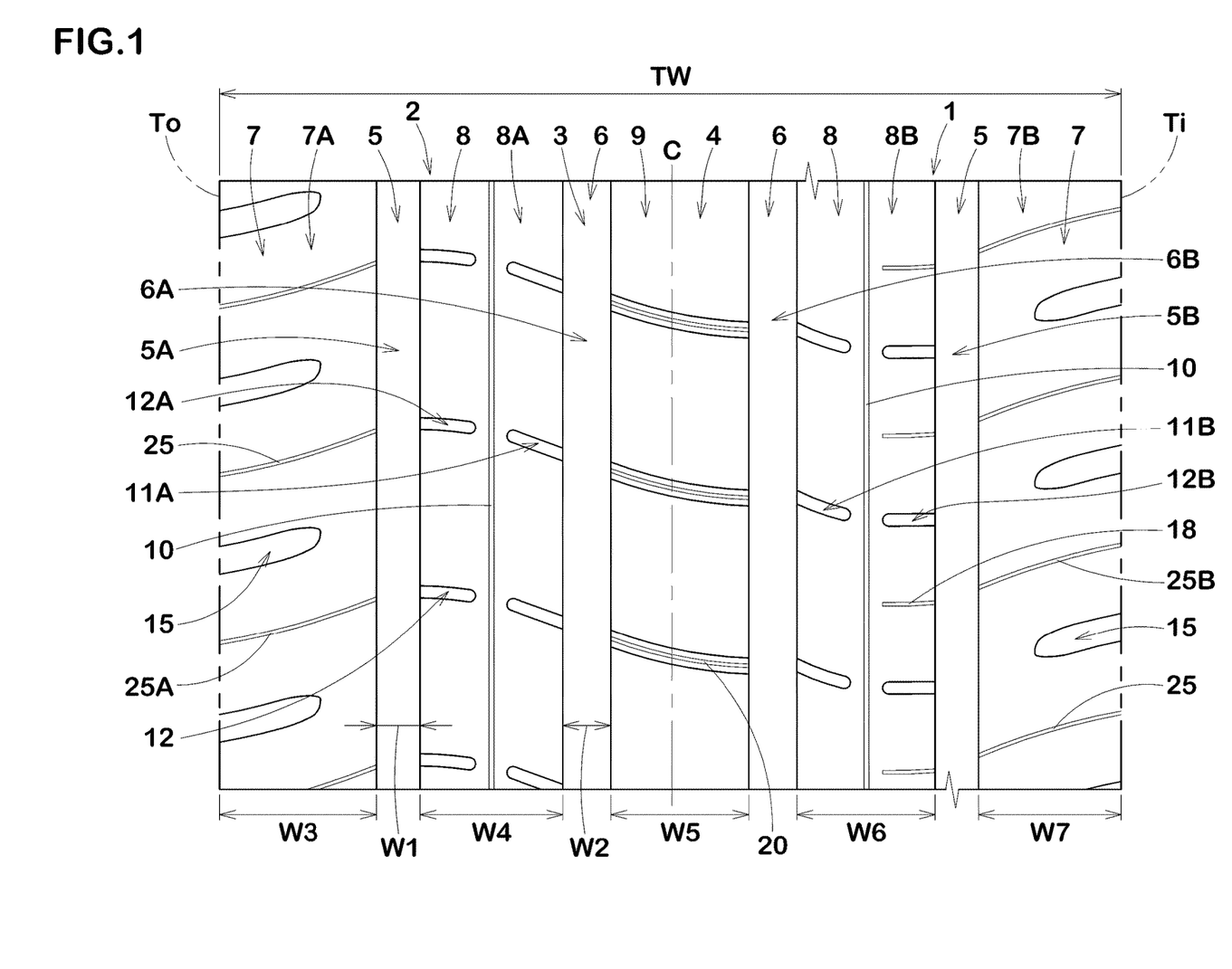
FIG. 1 is a developed partial view of the tread portion of a tire as an embodiment of the present invention.

FIG. 1 shows a part of the tread portion 2 of a tire 1 as an embodiment of the present invention.

In this embodiment, the tire 1 is a pneumatic tire designed for passenger cars although the present invention is not limited to such tire.

As well known in the art, a pneumatic tire comprises the tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

The tread edges Ti and To are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges Te determined as above.

In this embodiment, the tread portion 2 is provided with tread grooves forming a tread pattern which is left-right asymmetry (asymmetry about the tire equator c) as shown in FIG. 1. Therefore, the mounting position of the tire with respect to a vehicle is specified. For example, a sidewall (not shown) of the tire to be located on outside when installed on the vehicle is provided with an indication (letters or marks) representing "outside", and a sidewall to be located on inside is provided with an indication representing "inside".

Accordingly, the tread edges To and Ti are an outboard tread edge To to be positioned away from the center of a vehicle body, and an inboard tread edge Ti to be positioned close to the center of the vehicle body when the tire is installed on the vehicle.

The tread portion 2 is provided with four circumferential grooves 3 located between the tread edges To and Ti and extending continuously in the tire circumferential direction, thereby dividing the tread portion 2 into five land regions 4.

The circumferential grooves 3 in this example are straight grooves extending parallel to the tire circumferential direction, having constant groove widths, respectively. However, one or more of the circumferential grooves 3 may be a wavy or zigzag grooves or a groove whose width is periodically changed along the length thereof.

The circumferential grooves 3 are two shoulder circumferential grooves 5 and two crown circumferential grooves 6. The two shoulder circumferential grooves 5 are disposed one on each side of the tire equator c. The two crown circumferential grooves 6 are disposed between the two shoulder circumferential grooves 5. In this embodiment, the two crown circumferential grooves 6 are disposed one on each side of the tire equator C.

The two shoulder circumferential grooves 5 are an outboard shoulder circumferential groove 5A between the outboard tread edge To and the tire equator c, and an inboard shoulder circumferential groove 5B between the inboard tread edge Ti and the tire equator c.

The two crown circumferential grooves 6 are an outboard crown circumferential groove 6A between the outboard shoulder circumferential groove 5A and the tire equator c, and an inboard crown circumferential groove 6B between the inboard shoulder circumferential groove 5B and the tire equator c.

It is preferable that the distance in the tire axial direction from the tire equator c to the widthwise centerline of each shoulder circumferential groove 5 is set in a range from 25% to 35% of the tread width TW.

It is preferable that the distance in the tire axial direction from the tire equator c to the widthwise centerline of each crown circumferential groove 6 is set in a range from 5% to 15% of the tread width Tw.

Each of the circumferential grooves 3 has a groove width greater than 1.5 mm, preferably greater than 3.0 mm, more preferably greater than 4.0 mm.

It is preferable that the groove width of each of the circumferential grooves 3 is set in a range from 4.0% to 7.0% of the tread width Tw.

It is preferable that the groove depth of each of the circumferential grooves is set in a range from 5 to 12 mm.

In this embodiment, it is preferable that the shoulder circumferential grooves 5 have a groove width W1, the crown circumferential grooves 6 have a groove width W2, and the groove width W1 is less than the groove width W2. Specifically, the groove width W is in a range from 93% to 99%, preferably 94% to 98% of the groove width W2.

The land regions 4 are one crown land region 9 defined between the two crown circumferential grooves 6, two middle land regions 8 defined between the respective crown circumferential grooves 6 and the adjacent shoulder circumferential grooves 5, and two shoulder land regions 7 defined between the respective shoulder circumferential grooves 5 and the adjacent tread edges To and Ti.

In this embodiment, the two shoulder land regions 7 are an outboard shoulder land region 7A on the outboard tread edge To side, and an inboard shoulder land region 7B on the inboard tread edge Ti side.

The two middle land regions 8 are an outboard middle land region 8A and an inboard middle land region 8B.

The outboard middle land region 8A is located adjacently to the outboard shoulder land region 7A, and defined between the outboard shoulder circumferential groove 5A and the outboard crown circumferential groove 6A.

The inboard middle land region 8B is located adjacent to the inboard shoulder land region 7B, and defined between the inboard shoulder circumferential groove 5B and the inboard crown circumferential groove 6B.

Figure 2:
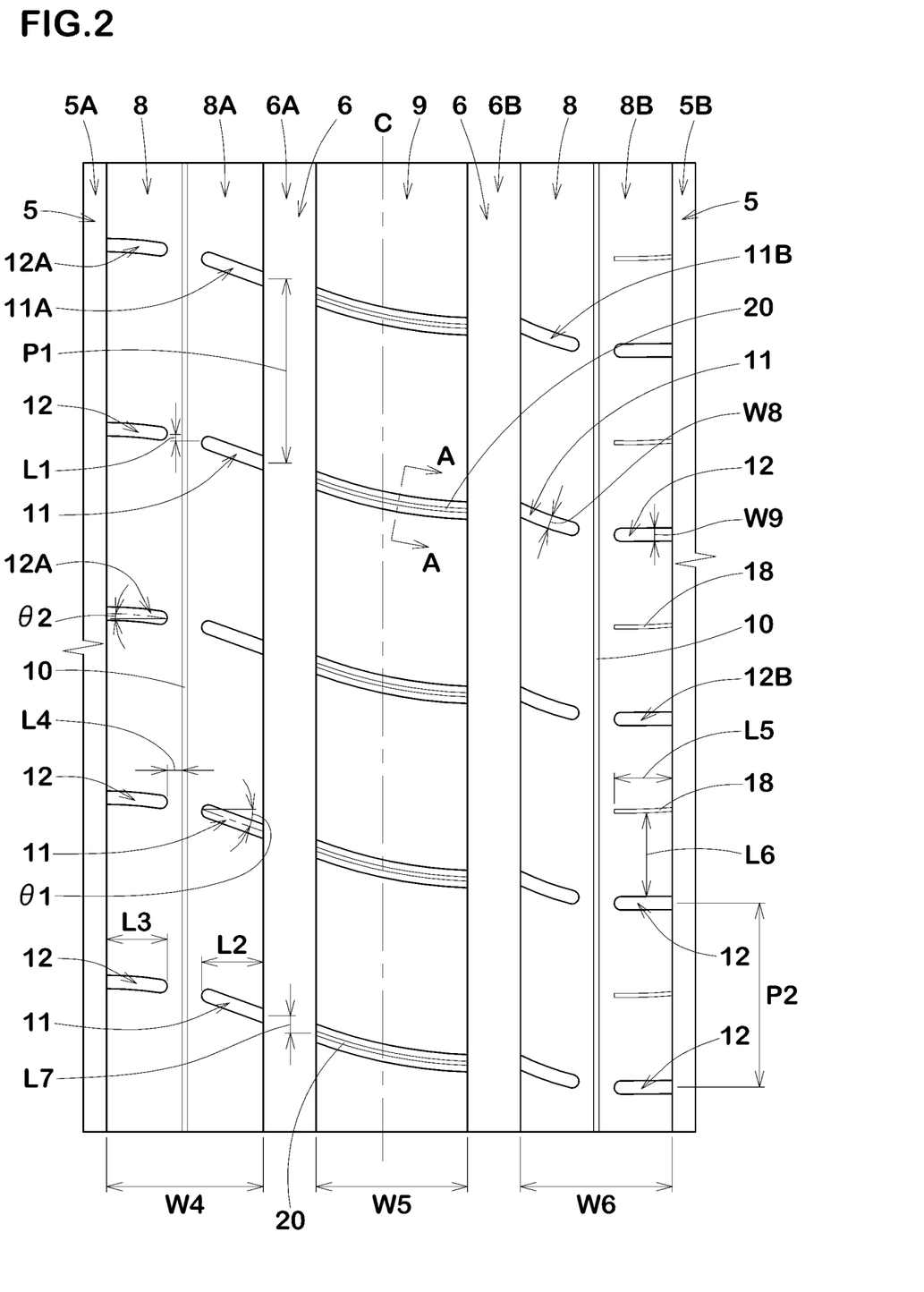
FIG. 2 is a developed partial view showing the outboard middle land region, the inboard middle land region and the crown land region of the tire shown in FIG. 1.

As shown in FIG. 2, each of the outboard middle land region 8A and the inboard middle land region 8B is provided with a single longitudinal sipe 10 extending continuously in the tire circumferential direction, a plurality of first middle transverse grooves 11 extending from the adjacent crown circumferential groove 6 and terminated within the middle land region 8 without being connected to the longitudinal sipe 10, and a plurality of second middle transverse grooves 12 extending from the adjacent shoulder circumferential groove 5 and terminated within the middle land region 8 being connected to the longitudinal sipe 10.

The longitudinal sipe 10 improves the ride comfort by moderately reducing the rigidity in the tire axial direction of the middle land region 8, while maintaining the rigidity in the tire circumferential direction of the middle land region 8. The first middle transverse grooves 11 and the second middle transverse grooves 12 are terminated within the respective middle land regions 8 without being connected to the respective longitudinal sipes 10, therefore the ride comfort is improved, while maintaining the rigidity in the tire circumferential direction of the middle land regions 8.

On the other hand, the two middle land regions 8 of which rigidity in the tire circumferential direction is maintained, can help to improve the steering stability.

The tire 1 having the middle land regions 8 as described above can be expected to produce relatively large cornering forces even when the ground contact pressure is low and the slip angle is small. Therefore, when such tire is installed on all wheels of a FWD vehicle for example, the rear tires can provide sufficient cornering force, and the yawing of the vehicle occurring when initiating cornering can be easily converged, and excellent steering stability is obtained.

Figure 3:
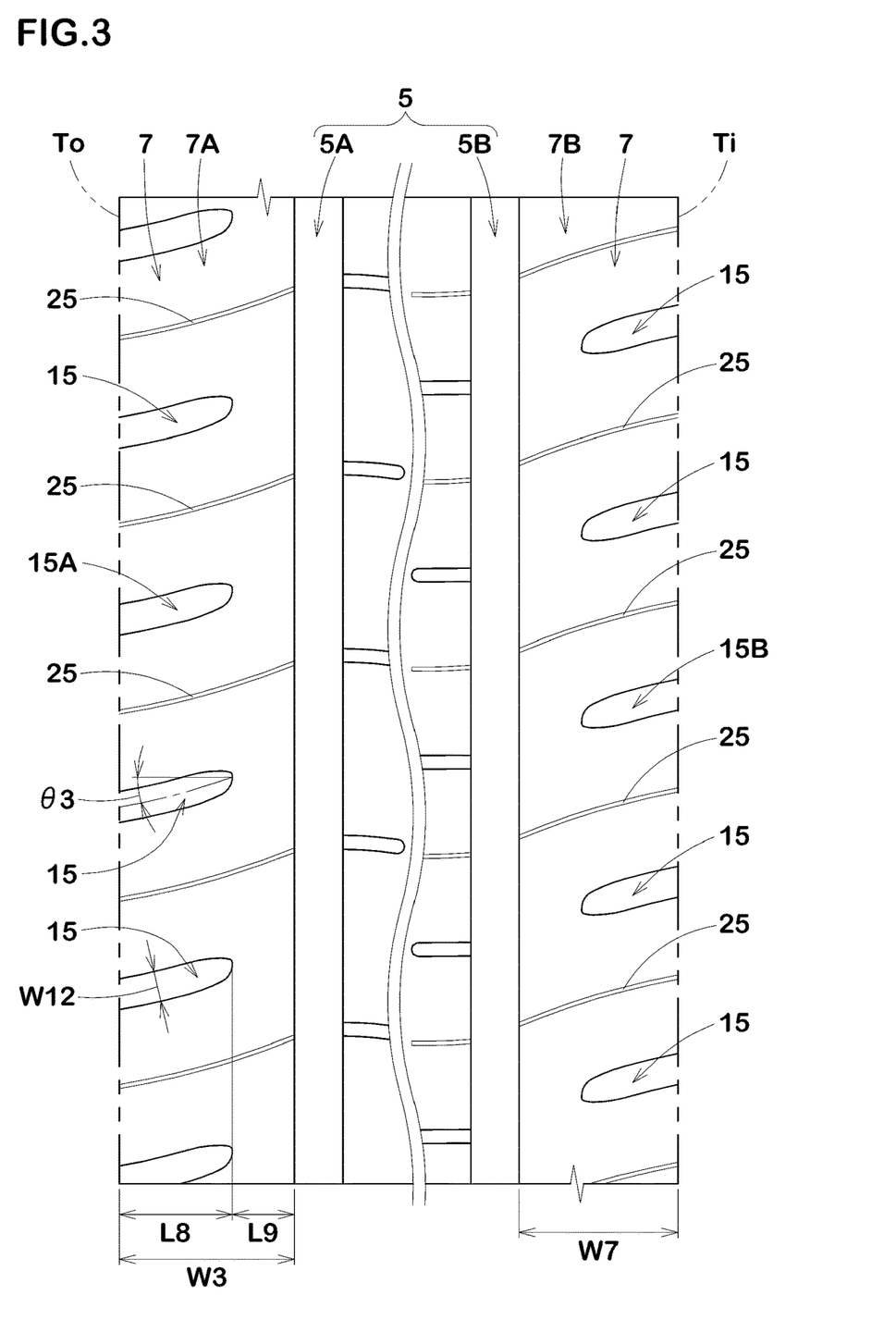
FIG. 3 is a developed partial view showing the outboard shoulder land region and the inboard shoulder land region of the tire shown in FIG. 1, omitting a middle part of the tread portion.

As shown in FIG. 3, each of the shoulder land regions 7 is provided with a plurality of shoulder transverse grooves 15 extending from the adjacent tread edge To, Ti and terminated within the shoulder land region 7. Therefore, excellent steering stability can be obtained while maintaining ride comfort.

In the present embodiment, the tire 1 is designed to provide better steering stability when installed on a FWD vehicle, and the widths in the tire axial direction of the land regions 4 (7, 7A, 7B, 8, 8A, 8B, 9 shown in FIG. 1) are defined as follows, The width W3 in the tire axial direction of the outboard shoulder land region 7A is greater than the width W4 in the tire axial direction of the outboard middle land region 8A. The width W4 in the tire axial direction of the outboard middle land region 8A is greater than the width 5 in the tire axial direction of the crown land region 9.

The width W5 in the tire axial direction of the crown land region 9 is greater than the width W6 in the tire axial direction of the inboard middle land region 8B.
The width W6 in the tire axial direction of the inboard middle land region 8B is greater than the width W7 in the tire axial direction of the inboard shoulder land region 7B. Accordingly, W3>W4>W5>W6>W7. Namely, the inboard shoulder land region 7B is narrowest among the five land regions 4, and the widths of the land regions 4 are gradually increased in the tire axial direction from the inboard shoulder land region 7B to the outboard shoulder land region 7A.

When such tire 1 is installed on all wheels of a FWD vehicle, the front tires exert a large cornering force to improve the response to steering, and at the same time, the rear tires also exert sufficient cornering force to facilitate convergence of the vehicle's yawing when initiating cornering. Therefore, the tire 1 can provide better steering stability when installed on all wheels of a FWD vehicle.

With a view to further enhance the above effect, the width W3 of the outboard shoulder land region 7A is preferably not less than 16% of the tread width Tw.
The width W3 of the outboard shoulder land region 7A is preferably set in a range from 101% to 107% of the width W5 of the crown land region 9.
The width W4 of the outboard middle land region 8A is preferably set in a range from 101% to 105% of the width W5 of the crown land region 9.
The width W6 of the inboard middle land region 8B is preferably set in a range from 95% to 99% of the width W5 of the crown land region 9.
The width W7 of the inboard shoulder land region 7B is preferably set in a range from 93% to 99% of the width W5 of the crown land region 9.
The tire 1 having such configuration is capable of exerting a large cornering force and improving steering stability, regardless of whether the tire is used for the front wheels or rear wheels of a vehicle.

As shown in FIG. 2, the longitudinal sipe 10 of the middle land region 8 is preferably disposed in a center portion in the tire axial direction of the middle land region 8.
The longitudinal sipe 10 has the effect described above and also reduces the sound generated when the middle land region 8 contacts with the ground, thereby it is possible to improve the noise performance.
Preferably, the distance in the tire axial direction from the axial edge on the tire equatorial c side of the middle land region 8 to the longitudinal sipe 10 is set in a range from 20% to 80%, more preferably 40% to 60% of the width in the tire axial direction of the middle land region 8.
More preferably, the longitudinal sipe 10 is disposed at the center in the tire axial direction of the middle land region 8.

The width of the longitudinal sipe 10 is less than 1.5 mm, preferably 0.6 to 1.2 mm. The depth of the longitudinal sipe 10 is, for example, 1.5 to 4.0 mm. The longitudinal sipe 10 extends for 80% to 100% of the entire tire circumference.

The first middle transverse grooves 11 (11A, 11B) are inclined with respect to the tire axial direction.
In this embodiment, the first middle transverse grooves 11A in the outboard middle land region 8A and the first middle transverse grooves 11B in the inboard middle land region 8B are inclined in the same direction with respect to the tire axial direction at an angle θ1. The angle θ1 of the first middle transverse grooves 11 is 15 to 30 degrees, preferably 19 to 25 degrees with respect to the tire axial direction. Such first middle lateral grooves 11 help to improve the ride comfort and the steering stability in a well-balanced manner.

The second middle transverse groove 12A in the outboard middle land region 8A is inclined with respect to the tire axial direction in the same direction as the first middle transverse grooves 11. But, the angle θ2 of the second middle transverse groove 12A with respect to the tire axial direction is smaller than the angle 81 of the first middle transverse groove 11. More specifically, the angle θ2 is set in a range from 5 to 15 degrees, preferably 7 to 13 degrees.

The angle of the second middle transverse groove 12B in the inboard middle land region 8B with respect to the tire axial direction is less than the angle θ2 of the second middle transverse grooves 12A in the outboard middle land region 8A. The angle of the second middle transverse groove 12B in the inboard middle land region 8B with respect to the tire axial direction is not more than 10 degrees, preferably not more than 5 degrees, most preferably substantially 0 degree, namely the second middle transverse grooves 12 are parallel to the tire axial direction.

The first middle transverse grooves 11 and the second middle transverse grooves 12 are arranged in the tire circumferential direction at substantially constant pitch lengths P1.

Here, the expression "substantially constant" means that an arrangement technique so-called pitch variation method used to reduce tire noise during running is not to be eliminated.
It is preferable that, in each of the middle land regions 8 (8A, 8B), the distance L1 in the tire circumferential direction between
an end on the longitudinal sipe 10 side of each of the first middle transverse grooves 11, and
an end on the longitudinal sipe 10 side of adjacent one of the second middle transverse grooves 12
is set to be not more than 10% of the above-mentioned constant pitch length P1 (or average of the pitch lengths P1 if a pitch variation method is employed).
Thereby, the rigidity of the middle land portion 8 is effectively reduced by the first middle transverse grooves 11 and the second middle transverse grooves 12, which improves the ride comfort and reduces the noise generated from the middle land portion 8 when contacting with the road surface.

The length L2 in the tire axial direction of the first middle transverse grooves 11 and the length L3 in the tire axial direction of the second middle transverse grooves 12 are preferably set in a range from 30% to 45% of the width in the tire axial direction of the land region where these grooves are provided (i.e., the width W4 of the outboard middle land region 8A or the width W6 of the inboard middle land region 8B).

The above-mentioned length L2 of the first middle transverse grooves 11 and the above-mentioned length L3 of the second middle transverse grooves 12 are preferably set in a range from 6.0 to 11.0 mm, more preferably from 9.0 to 10.4 mm. For example, the distances L4 in the tire axial direction from the longitudinal sipe 10 to the end on the longitudinal sipe 10 side of each of the first middle transverse grooves 11 (11A, 11B) and the second middle transverse grooves 12 (12A, 12B) is set in a range from 3.0 to 5.0 mm.
Such first middle transverse grooves 11 and the second middle transverse grooves 12 help to improve the steering stability and the ride comfort in a well-balanced manner.
In this regard, it is preferred that the groove width W8 of the first middle transverse grooves 11 and the groove width W9 of the second middle transverse grooves 12 are set in a range of not more than 3.5 mm, preferably from 1.8 to 2.2 mm.

As shown in FIG. 2, the inboard middle land region 8B is provided with a plurality of inboard middle sipes 18.

The inboard middle sipes 18 extend from the inboard shoulder circumferential groove 5B and are terminated within the inboard middle land region 8B without being connected to the longitudinal sipe 10 therein.

such inboard middle sipes 18 mitigate the rigidity of the inboard middle land region 8B and improve the ride comfort and noise performance.

The length L5 in the tire axial direction of the inboard middle sipes 18 is, for example, set in a range from 30% to 45% of the above-mentioned width W6 in the tire axial direction of the inboard middle land region 8B.

Specifically, the length L5 of the inboard middle sipes 18 is set in a range from 6.0 to 11.0 mm, preferably from 9.0 to 10.4 mm.

The width of the inboard middle sipes 18 is in a range from 0.5 to 1.5 mm, preferably from 0.5 to 0.7 mm.

The angle of the inboard middle sipes 18 with respect to the tire axial direction is, for example, set in a range from 0.9 to 1.5 degrees.

In this embodiment, the inboard middle sipes 18 and the second middle transverse grooves 12 are arranged alternately in the tire circumferential direction.

The distances L6 in the tire circumferential direction between each of the inboard middle sipes 18, and adjacent two of the second middle transverse grooves 12 are, for example, set in a range from 35% to 50% of a pitch length P2 in the tire circumferential direction between the above-said adjacent two second middle transverse grooves 12.

such arrangement of the inboard middle sipes 18 can enhance the above-described effect, while suppressing uneven wear of the inboard middle land region 8B.

In this embodiment, the outboard middle land region 8A is provided with no grooves other than the above-described first middle transverse grooves 11 and second middle transverse grooves 12, and sipes other than the above-described single longitudinal sipe 10.

Further, in this embodiment, the inboard middle land region 8B is provided with no grooves other than the above-described first middle transverse grooves 11, and second middle transverse grooves 12, and no sipes other than the above-described single longitudinal sipe 10, and inboard middle sipes 18.

In this embodiment, the crown land region 9 is provided with a plurality of crown narrow grooves 20 or alternatively crown sipes 20. The crown narrow grooves (or crown sipes) 20 extend across the entire width of the crown land region 9. The crown narrow grooves (or crown sipes) 20 are arranged in the tire circumferential direction at the same pitches in the tire circumferential direction as those of the first middle transverse grooves 11.

In this embodiment, as shown in FIG. 2, the distance L7 in the tire circumferential direction between the groove widthwise center of each first middle transverse groove 11 (11A, 11B) at its end on the tire equatorial c side, and the groove widthwise center of adjacent one of the crown narrow grooves (or crown sipes) 20 at its end which is adjacent to the above-said end on the tire equatorial c side of the above-said each first middle transverse groove 11 (11A, 11B), is set to be not more than 10% of the above-described one pitch length P1 in the tire circumferential direction of the first middle transverse grooves 11. And, preferably, these two ends of the first middle transverse groove 11 and the crown narrow groove (or crown sipe) 20, which are opened to the same crown circumferential groove 6, are arranged so that the circumferential extent of one of the two ends overlaps, in the tire circumferential direction, with the circumferential extent of the other of the two ends. Thereby, the outboard middle land region and the inboard middle land region work together to provide a large cornering force and improve the linearity of steering.

The angle of the crown narrow grooves (or crown sipes) 20 with respect to the tire axial direction is preferably set in a range from 5 to 15 degrees, more preferably 8 to 14 degrees. In this embodiment, the angle is varied smoothly or continuously along the groove length, and as a result, all the crown narrow grooves (or crown sipes) 20 are curved convexly toward one side in the tire circumferential direction (downward in FIG. 2).

Figure 4:
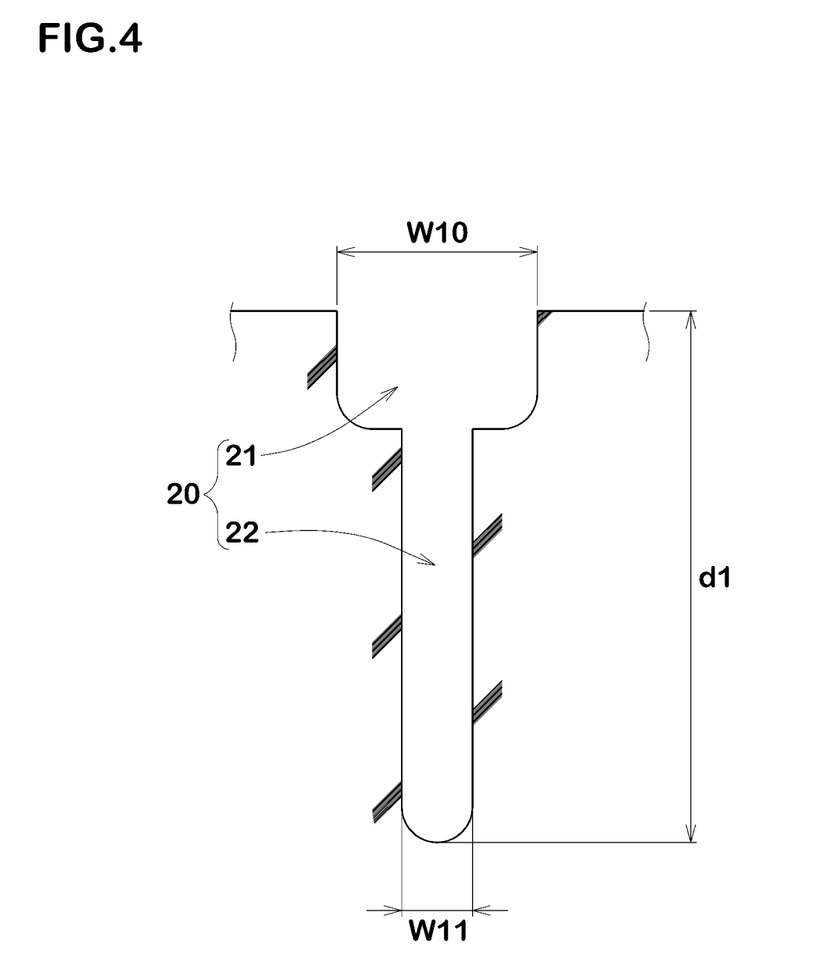
FIG. 4 is a cross-sectional view of a crown narrow groove taken along line A-A in FIG. 2.

In this embodiment, there are disposed the crown narrow grooves 20 each having a cross-sectional shape shown in FIG. 4. As shown, the crown narrow groove 20 comprises a radially outer wide portion 21, and a radially inner narrow portion 22 connected to the radially inner end of the wide portion 21.

The radially outer wide portion 21 is opened at the tread surface, and the opening width 10 is in a range from 1.6 to 2.8 mm. The radially inner narrow portion 22 has a width W11 in a range from 0.5 to 1.5 mm.

Such crown narrow grooves 20 help to improve the steering stability and ride comfort in a well-balanced manner.

In this regard, it is preferred that the depth d1 of the crown narrow grooves 20 is set in a range of not more than 5.0 mm, more preferably from 1.5 to 3.5 mm.

In this embodiment, the crown land region 9 is provided with no grooves other than the crown narrow grooves 20 and no sipes as shown in FIG. 2. This ensures the rigidity of the crown land region 9 and improves the steering stability.

When the crown sipes 20 are disposed instead of the crown narrow grooves 20, the crown land region 9 is provided with no grooves and no sipes other than the crown sipes 20. The depth (d1) of the crown sipes 20 is, for example, set in a range of not more than 5.0 mm, more preferably from 1.5 to 3.5 mm. The width (W11) the crown sipes 20 is, for example, set in a range from 0.5 to 1.5 mm.

In this embodiment, the shoulder transverse grooves 15 are inclined with respect to the tire axial direction.

Further, in this embodiment, the shoulder transverse grooves 15 are inclined in the opposite direction to the first middle transverse grooves 11 (11A, 11B) with respect to the tire axial direction as shown in FIG. 1.

The angle θ3 of the widthwise center line of each shoulder transverse grooves 15 with respect to the tire axial direction is, for example, set in a range from 10 to 30 degrees. Such shoulder transverse grooves 15 can provide frictional forces in a different direction from those by the first middle transverse grooves 11 by their edges, which helps to improve the steering stability.

The groove width W12 of the shoulder transverse grooves 15 (15A, 15B) is, for example, set in a range from 2.0 to 8.0 mm. The length L8 in the tire axial direction of the shoulder transverse grooves 15 (15A, 15B) is, for example, set in a range from 50% to 80% of the width in the tire axial direction of the shoulder land region 7 (7A, 7B) where the shoulder transverse grooves 15 are provided (i.e., the width W3 of the outboard shoulder land region 7A or the width W7 of the inboard shoulder land region 7B).

The distance L9 in the tire axial direction from the axially inner ends of the shoulder transverse grooves 15 (15A, 15B) to the shoulder circumferential groove 5 (5A, 5B) is, for example, set in a range from 5 to 25 mm, preferably from 12 to 20 mm. Preferably, the distance L9 is greater than the distances in the tire axial direction between the first middle transverse grooves 11 and the second middle transverse grooves 12 in each middle land region 8. This helps to make the shoulder land regions 7 sufficiently rigid.

It is preferable that the length in the tire axial direction of the shoulder transverse grooves 15B in the inboard shoulder land region 7B is less than the length in the tire axial direction of the shoulder transverse groove 15A in the outboard shoulder land region 7A. This ensures rigidity of the vicinity of the inboard tread edge Ti, which facilitates the improvement of the steering stability.

The shoulder land regions 7 (7A, 7B) are each provided with a plurality of shoulder sipes 25. The shoulder sipes 25 extend across the respective shoulder land regions 7.
In this embodiment, the shoulder sipes 25 and the shoulder transverse grooves 15 in each shoulder land region 7 are arranged alternately in the tire circumferential direction. The width of the shoulder sipes 25 is, for example, 0.6 to 1.2 mm.

It is preferable that the distance in the tire circumferential direction between
the sipe end on the shoulder circumferential groove 5A side of each shoulder sipe 25A in the outboard shoulder land region 7A, and
the groove end on the shoulder circumferential groove 5A side of adjacent one of the second middle transverse grooves 12A in the outboard middle land region 8A
is not more than 10% of a pitch length in the tire circumferential direction between the second middle transverse grooves 12A. In other words, the sipe end and the groove end are almost aligned in the tire circumferential direction as shown in FIG. 1. Thereby, the outboard shoulder land region 7A and the outboard middle land region 8A work together to provide cornering forces and improve the linearity of steering.

In the same regard, it is preferable that the distance in the tire circumferential direction between
the sipe end on the shoulder circumferential groove 5B side of each shoulder sipe 25B in the inboard shoulder land region 7B, and
the sipe end on the shoulder circumferential groove 5B side of adjacent one of the inboard middle sipes 18 in the inboard middle land region 8B
is not more than 10% of a pitch length in the tire circumferential direction between the inboard middle sipes 18. In other words, these two sipe ends are almost aligned in the tire circumferential direction as shown in FIG. 1.

Each of the shoulder land regions 7 is provided with no grooves other than the shoulder transverse grooves 15 (15A, 15B) and no sipes other than the shoulder sipes 25 (25A, 25B).

In this embodiment, due to the above-described arrangement of the grooves and the sipes in the respective land regions, when the tire is installed on a vehicle in order, the outboard shoulder land region 7A, the outboard middle land region 8A, the crown land region 9, and the inboard middle land region 8B respectively become higher in the circumferential rigidity than the land regions respectively adjacent thereto on the inner side of the vehicle.
As a result, in the tire 1 having such rigidity distribution, the land regions as a whole can provide a large cornering force, and improve the linearity of steering.

Figure 5:
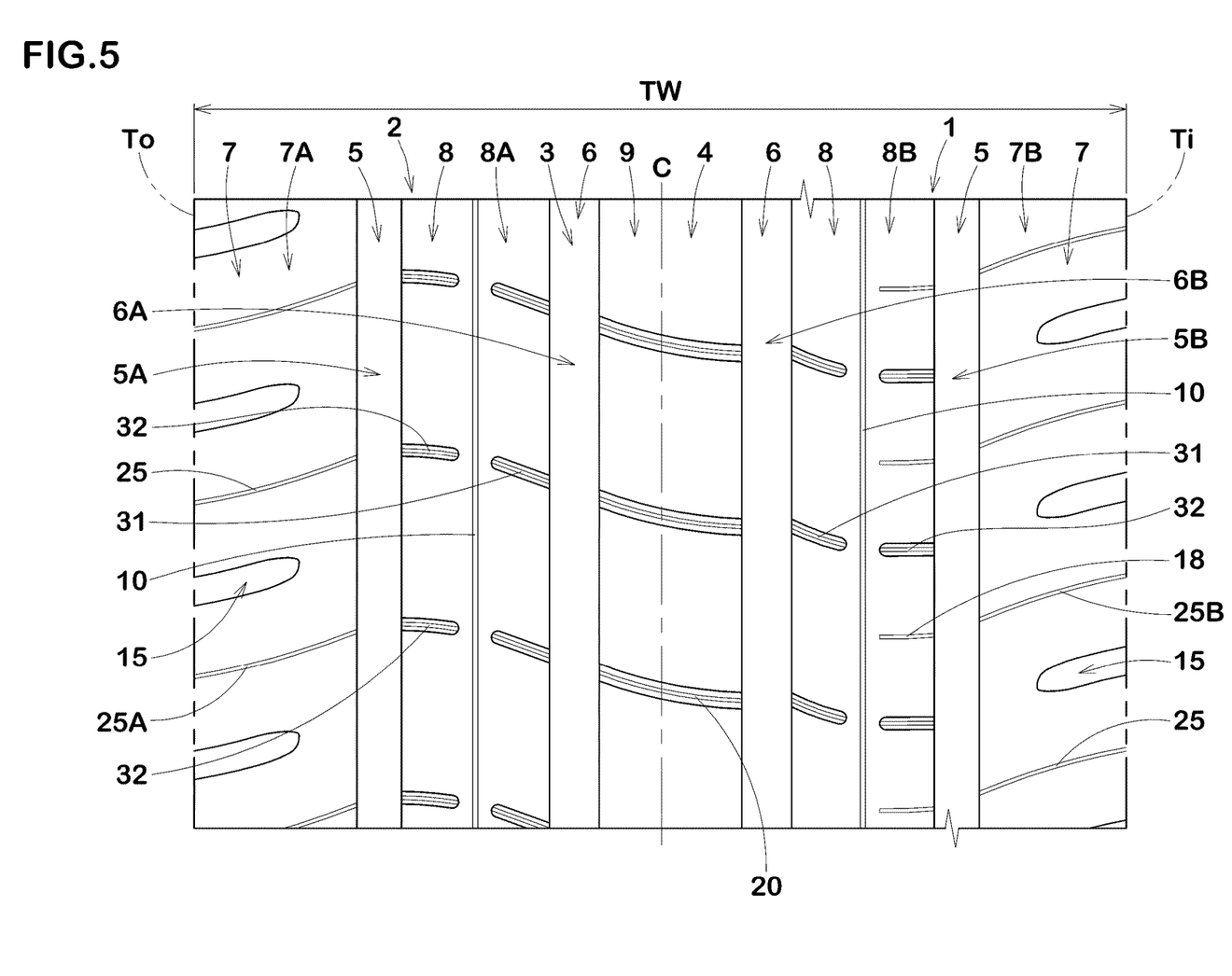
FIG. 5 is a developed partial view of the tread portion of a tire as another embodiment of the present invention.
Figure 6:
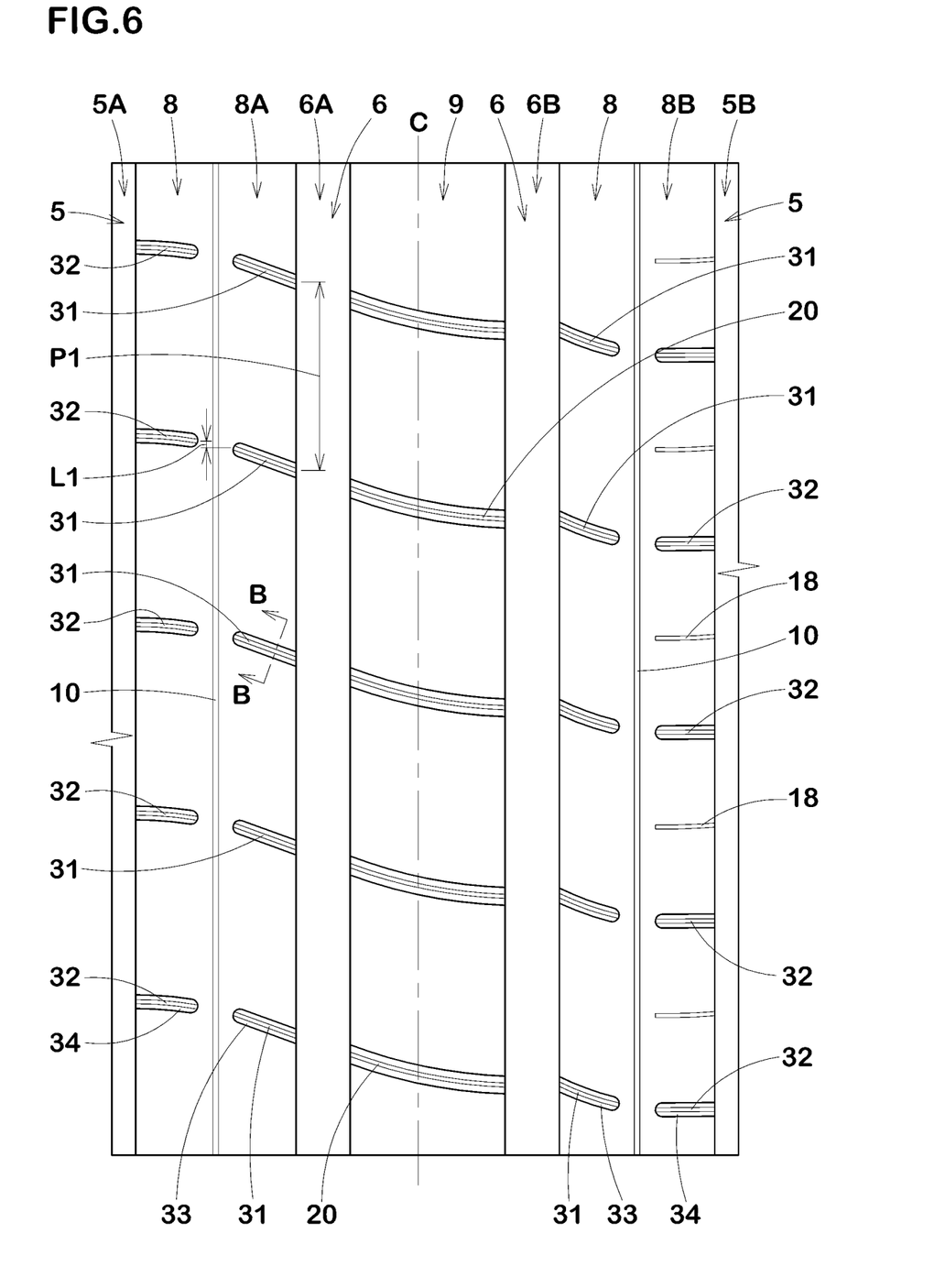
FIG. 6 is a developed partial view showing the outboard middle land region, the inboard middle land region and the crown land region of the tire shown in FIG. 5.

FIG. 5 is a developed partial view of the tread portion 2 of the tire 1 as another embodiment of the present invention.
FIG. 6 is a developed partial view showing the outboard middle land region 8A, the inboard middle land region 8B and the crown land region 9 of the tire shown in FIG. 5.
For the components of this embodiment not specifically described hereunder, the descriptions of the corresponding components made in the former embodiment shown in FIGS. 1 to 4 may be applied.

In this embodiment, as shown in FIGS. 5 and 6, each of the two middle land regions 8 (namely, the outboard middle land region 8A and the inboard middle land region 8B) is provided with
a plurality of first middle sipes 31 extending from the adjacent crown circumferential groove 6 and terminated within the middle land region 8 without being connected to the longitudinal sipe 10 therein, and
a plurality of second middle sipes 32 extending from the adjacent shoulder circumferential groove 5 and terminated within the middle land region 8 without being connected to the longitudinal sipe 10 therein.
such first middle sipes 31 and second middle sipes 32 can maintain the rigidity of the respective middle land regions 8 and further improve steering stability.

As to the configurations, e.g., length, angle and pitch of the first middle sipes 31 in the plane view of the tread portion, those of the first middle transverse grooves 11 described above may be applied.

As to the configurations, e.g., length, angle and pitch of the second middle sipes 32 in the plane view of the tread portion, those of the second middle transverse grooves 12 described above may be applied.

Figure 7:
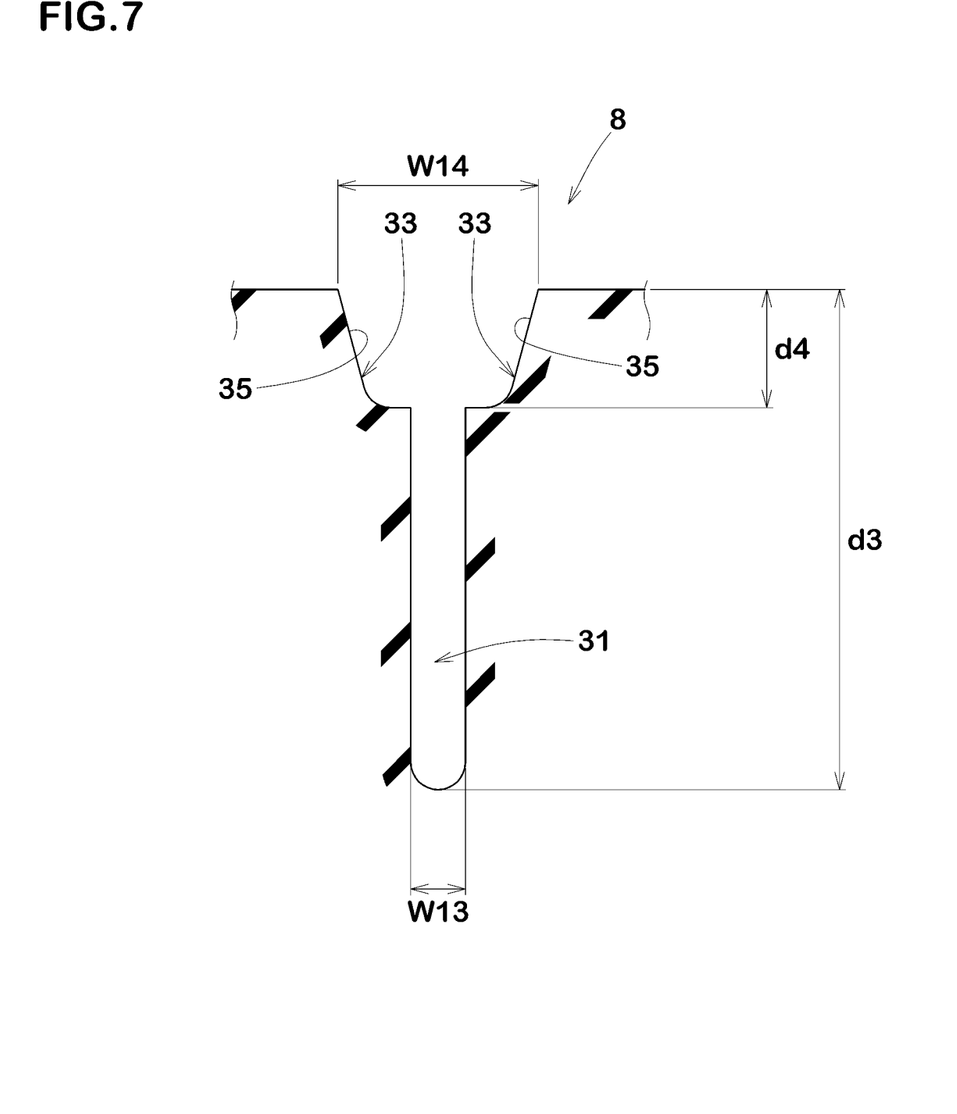
FIG. 7 is a cross-sectional view taken along line B-B in FIG. 6, showing an example of a middle sipe (first middle sipe) with chamfers on both sides.

FIG. 7 is a cross-sectional view taken along line B-B in FIG. 6. As shown, the first middle sipe 31 is provide, on the radially outermost portion thereof, with a first chamfer 33 extending to the ground contacting surface of the middle land region 8. Thereby, the first middle sipe 31 comprises
a radially inner narrow portion having a width W13, for example, in a range of from 0.5 to 1.5 mm, and
a radially outer wide portion opened at the ground contacting surface of the middle land region 8, and having an opening width W14 greater than the width of the radially inner narrow portion.
Preferably, the first chamfer 33 is provided at each of the edges of the first middle sipes 31 which edges are on both sides in the tire circumferential direction.
Such first chamfers 33 can suppress the deformation of the ground contacting top surface of the middle land region 8 and suppress its uneven wear.
However, the first middle sipe 31 is not limited to this configuration, for example, the first middle sipe 31 may extend from the bottom thereof to the ground contacting top surface of the middle land region 8 with a constant width.

For example, the opening width W14 is set in a range from 3.0 to 4.5 times the above-mentioned width W13 of the first middle sipe 31.
The radial dimension d4 of the first chamfers 33 are not more than 30%, preferably in a range from 15% to 25% of the total depth d3 of the first middle sipe 31 measured from the ground contacting top surface of the middle land region 8 to the bottom of the first middle sipe 31.

The first chamfer 33 in this example comprises an inclined surface 35 extending radially inwardly from the ground contacting top surface of the middle land region 8. For example, the inclined surface 35 is inclined at an angle of from 10 to 45 degrees with respect to a normal line passing through an edge of the opening of the first chamfer 33 perpendicularly to the ground contacting top surface of the middle land region 8.

The arrangement of the first chamfers 33 of the first middle sipes 31 shown in FIG. 7 can also be applied to the second middle sipes 32 and the second chamfers 34.

Similarly, as shown in FIG. 6, the second middle sipes 32 is provided, on the radially outermost portion thereof, with a second chamfer 34 extending to the ground contacting surface of the middle land region 8.

Preferably, the second chamfer 34 is provided at each of the edges of the second middle sipes 32 which edges are on both sides in the tire circumferential direction.

The configurations of the first chamfers 33 shown in FIG. 7 described above can be applied to the second chamfers 34.

Figure 8:
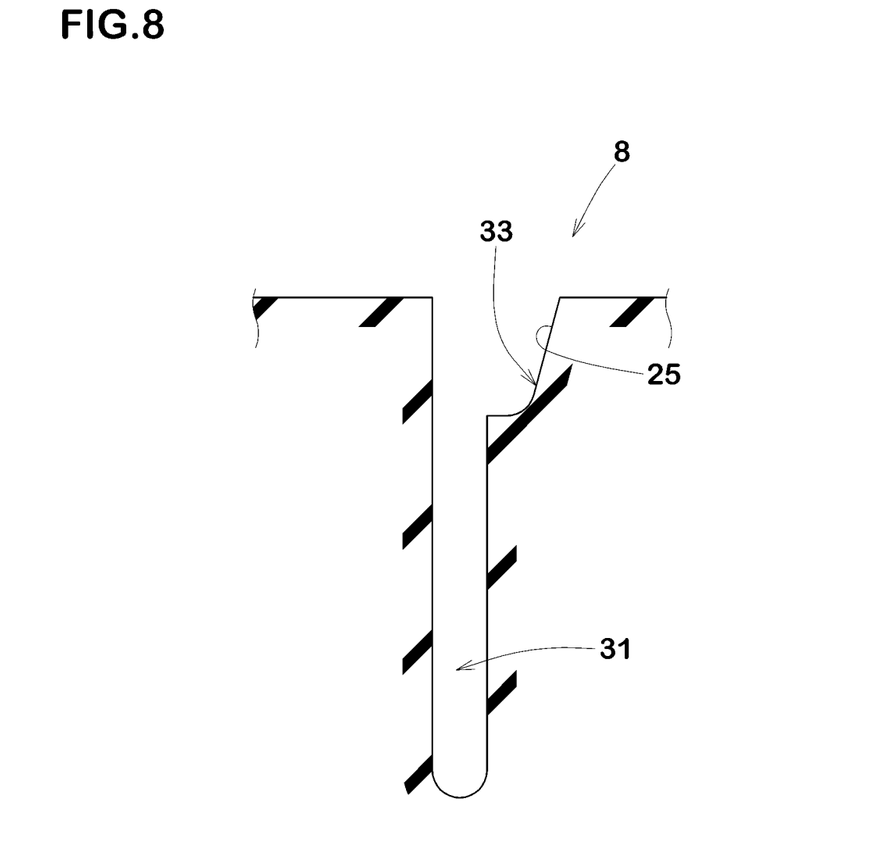
FIG. 8 is a cross-sectional view of another example of the middle sipe (first middle sipe) with a chamfer on only one side.

FIG. 8 shows another example of the arrangement of the first chamfers 33. In this example, the first chamfers 33 are provided only at the edges of the first middle sipes 31, which edges are on one side in the tire circumferential direction. Such arrangement of the first chamfers 33 can suppress the deformation of the ground contacting top surface of the middle land region 8, while maintaining the rigidity of the middle land region 8.

The arrangement of the first chamfers 33 of the first middle sipes 31 shown in FIG. 8 can also be applied to the second middle sipes 32 and the second chamfers 34.

While detailed description has been made of a preferable embodiment of the present invention, the present invention can be embodied in various forms without being limited to the illustrated embodiment.

Comparison Tests

Pneumatic tires of size 205/55R16 (rim size 16×6.5J) having specifications shown in Table 1 and Table 2 were experimentally manufactured as test tires including working example tires Ex.1-Ex.17 and a comparison tire Ref.1. The test tires Ex.1-Ex.17 had tread patters based on the tread pattern shown in FIG. 1.

Figure 9:
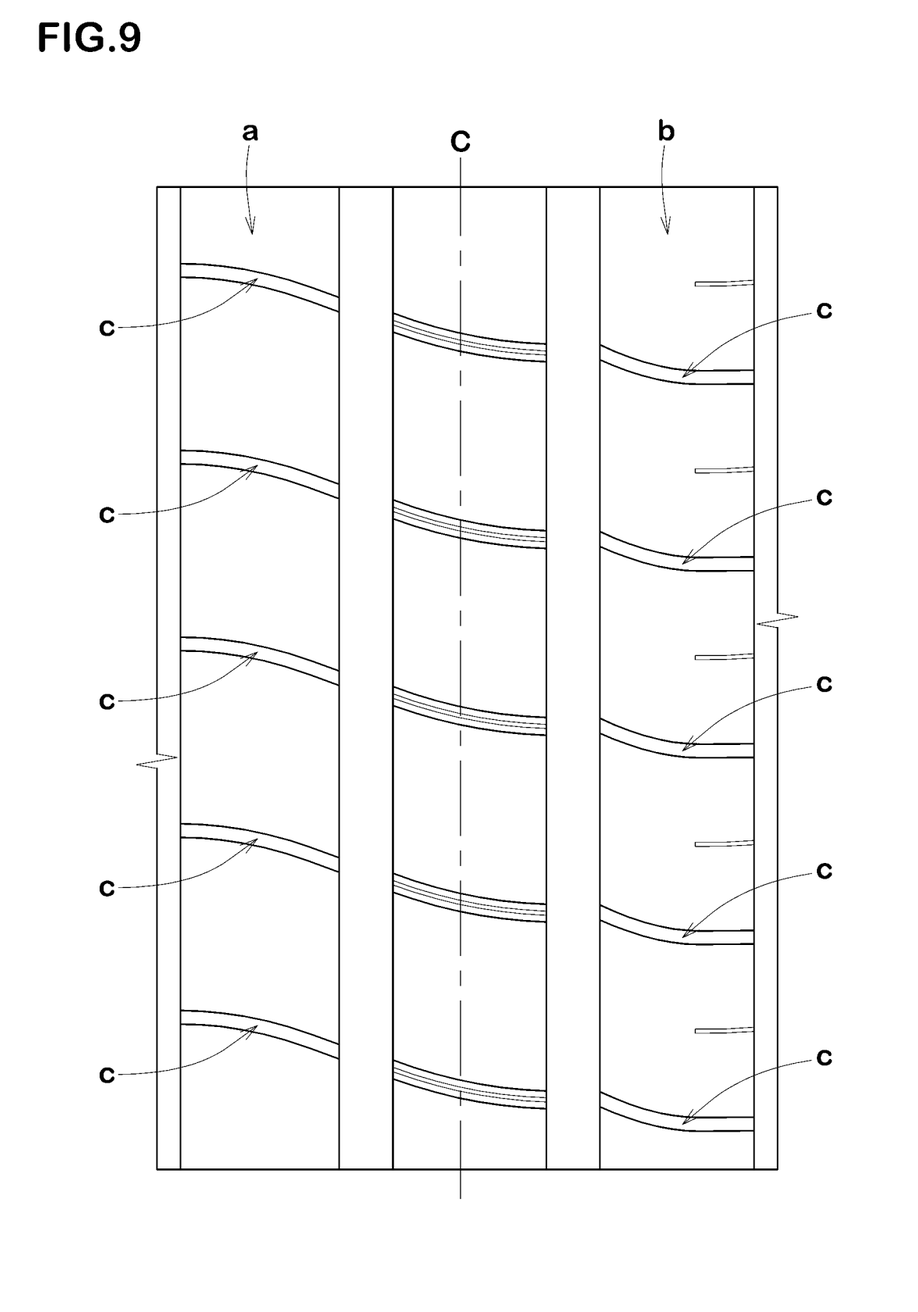
FIG. 9 is a developed partial view showing an outboard middle land region, a crown land region and an inboard middle land region of a tire used as a comparative example.

The comparison tire Ref.1 had a tread pattern modified from the FIG. 1 pattern by replacing the outboard middle land region 8A and the inboard middle land region 8B with those shown in FIG. 9 wherein an outboard middle land region (a) and an inboard middle land region (b) were each provided with transverse grooves (c) across the respective land regions but not provided with a longitudinal sipe extending continuously in the tire circumferential direction.

The test tires were tested for the steering stability, ride comfort and noise performance as follows, using a test car (1500 cc front-wheel drive passenger car) with all wheels on which test tires inflated to 220 kPa were mounted.

<Steering Stability Test & Ride Comfort Test>

The test car was run on a dry road surface, and the test driver evaluated the steering stability and the ride comfort. The results are indicated in Tables 1 and 2 by an index based on Ref. 1 being 100, wherein the larger the value, the better the steering stability and the ride comfort.

<Noise Performance Test>

When the test car was running on the dry road surface at 40 to 100 km/h, the maximum sound pressure level of the noise heard in the test car was measured.

The results are indicated in Tables 1 and 2 by an index based on Ref. 1 being 100, wherein the smaller the value, the lower the running noise, namely the better the noise performance.

TABLE 1

| Tire | Ref. 1 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| middle land regions | FIG. 9 | FIG. 2 | FIG. 2 | FIG. 2 | FIG. 2 | FIG. 2 | FIG. 2 | FIG. 2 | FIG. 2 | FIG. 2 |
| W3/W5 (%) | 104 | 104 | 101 | 102 | 106 | 107 | 104 | 104 | 104 | 104 |
| W4/W5 (%) | 102 | 102 | 102 | 102 | 102 | 102 | 100 | 101 | 104 | 105 |
| W6/W5 (%) | 98 | 98 | 98 | 98 | 98 | 98 | 98 | 98 | 98 | 98 |
| W7/W5 (%) | 96 | 96 | 96 | 96 | 96 | 96 | 96 | 96 | 96 | 96 |
| steering stability | 100 | 108 | 104 | 106 | 108 | 108 | 107 | 108 | 107 | 105 |
| ride comfort | 100 | 100 | 102 | 101 | 100 | 99 | 101 | 100 | 100 | 100 |
| noise performance | 100 | 98 | 97 | 98 | 98 | 99 | 98 | 98 | 99 | 99 |

TABLE 2

| Tire | Ex. 10 | Ex. 11 | Ex. 12 | Ex. 13 | Ex. 14 | Ex. 15 | Ex. 16 | Ex. 17 |
|---|---|---|---|---|---|---|---|---|
| middle land regions | FIG. 2 | FIG. 2 | FIG. 2 | FIG. 2 | FIG. 2 | FIG. 2 | FIG. 2 | FIG. 2 |
| W3/W5 (%) | 104 | 104 | 104 | 104 | 104 | 104 | 104 | 104 |
| W4/W5 (%) | 102 | 102 | 102 | 102 | 102 | 102 | 102 | 102 |
| W6/W5 (%) | 95 | 96 | 99 | 100 | 98 | 98 | 98 | 98 |
| W7/W5 (%) | 96 | 96 | 96 | 96 | 93 | 95 | 97 | 99 |
| steering stability | 104 | 105 | 108 | 107 | 105 | 107 | 108 | 104 |
| ride comfort | 101 | 100 | 100 | 100 | 101 | 100 | 100 | 100 |
| noise performance | 97 | 98 | 98 | 99 | 97 | 97 | 98 | 99 |

From the test results, it was confirmed that the tires according to the present invention demonstrated excellent steering stability while maintaining ride comfort.

Further, it was also confirmed that the tires according to the present invention exhibited excellent noise performance.

Further, test tires having the middle land regions shown in FIG. 6 were experimentally manufactured according to specifications shown in Table 3, and tested in the same manner as described above. The test results are shown in Table 3.

TABLE 3

| Tire | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| middle land regions | FIG. 6 | FIG. 6 | FIG. 6 | FIG. 6 | FIG. 6 | FIG. 6 | FIG. 6 | FIG. 6 | FIG. 6 |
| W3/W5 (%) | 104 | 101 | 102 | 106 | 107 | 104 | 104 | 104 | 104 |
| W4/W5 (%) | 102 | 102 | 102 | 102 | 102 | 100 | 101 | 104 | 105 |

TABLE 3-continued

| Tire | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| W6/W5 (%) | 98 | 98 | 28 | 98 | 98 | 28 | 98 | 98 | 98 |
| W7/W5 (%) | 96 | 96 | 96 | 96 | 96 | 96 | 96 | 96 | 96 |
| steering stability | 109 | 105 | 107 | 109 | 109 | 107 | 108 | 107 | 106 |
| ride comfort | 100 | 101 | 100 | 99 | 98 | 100 | 100 | 100 | 99 |
| noise performance | 96 | 95 | 96 | 96 | 97 | 96 | 96 | 97 | 97 |

From the test results, it was confirmed that the working example tires shown in Table 3 demonstrated excellent steering stability while maintaining ride comfort, and exhibited excellent noise performance.

DESCRIPTION OF THE REFERENCE SIGNS 2 tread portion
3 circumferential groove
4 land region
5 shoulder circumferential groove
6 crown circumferential groove
7 shoulder land region
8 middle land region
9 crown land region
10 longitudinal sipe
11 first middle transverse groove
12 second middle transverse groove
15 shoulder transverse groove

The invention claimed is:

1. A tire comprising:
a tread portion provided with four circumferential grooves extending continuously in the tire circumferential direction to axially divide the tread portion into five land regions,
the four circumferential grooves including two shoulder circumferential grooves, and two crown circumferential grooves therebetween,
the five land regions including two shoulder land regions between the two shoulder circumferential grooves and tread edges, two middle land regions between the shoulder circumferential grooves and the crown circumferential grooves, and one crown land region between the two crown circumferential grooves,
wherein each of the two middle land regions is provided with
a longitudinal sipe extending continuously in the tire circumferential direction,
first middle transverse grooves each extending from the adjacent crown circumferential groove and terminated within the middle land region without being connected to the longitudinal sipe therein, and
second middle transverse grooves extending from the adjacent shoulder circumferential groove and terminated within the middle land region without being connected to the longitudinal sipe therein, and
each of the two shoulder land regions is provided with shoulder transverse grooves extending from the adjacent tread edge and terminated within the shoulder land region,
wherein
the tire has a mounting position on a vehicle specified such that the tread edges are an outboard tread edge to be positioned away from a center of a vehicle body and an inboard tread edge to be positioned closer to the center of the vehicle body, whereby
said two shoulder land regions are an outboard shoulder land region extending axially inwardly from the outboard tread edge, and an inboard shoulder land region extending axially inwardly from the inboard tread edge, and
said two middle land regions are an outboard middle land region adjacent to the outboard shoulder land region, and an inboard middle land region adjacent to the inboard shoulder land region,
wherein
the width in the tire axial direction of the outboard shoulder land region is greater than the width in the tire axial direction of the outboard middle land region which is greater than the width in the tire axial direction of the crown land region which is greater than the width in the tire axial direction of the inboard middle land region which is greater than the width in the tire axial direction of the inboard shoulder land region.

2. The tire according to claim 1, wherein the crown land region is provided with crown narrow grooves or alternatively crown sipes extending across the entire width of the crown land region.

3. The tire according to claim 1, wherein
the width in the tire axial direction of the outboard shoulder land region is between 101% and 107% of the width in the tire axial direction of the crown land region, and
the width in the tire axial direction of the inboard shoulder land region is in a range from 93% to 99% of the width in the tire axial direction of the crown land region.

4. The tire according to claim 1, wherein a circumferential rigidity of the outboard shoulder land region is greater than a circumferential rigidity of the outboard middle land region which is greater than a circumferential rigidity of the crown land region which is greater than a circumferential rigidity of the inboard middle land region.

5. The tire according to claim 1, wherein the groove width of the shoulder circumferential groove is less than the groove width of the crown circumferential groove.

6. The tire according to claim 5, wherein the groove width of the shoulder circumferential groove is in a range from 93% to 99% of the groove width of the crown circumferential groove.

7. The tire according to claim 1, wherein the crown land region is provided with crown sipes extending across the entire width of the crown land region.

8. The tire according to claim 7, wherein
a distance in the tire circumferential direction between
the groove widthwise center of each first middle transverse groove at its end on the tire equatorial side, and
the groove widthwise center of adjacent one of the crown narrow grooves at its end which is adjacent to said end on the tire equatorial side of said each first middle transverse groove
is not more than 10% of a pitch length in the tire circumferential direction between the first middle transverse grooves.

9. The tire according to claim 8, wherein the angle of the crown narrow grooves with respect to the tire axial direction is in a range from 5 to 15 degrees, and is varied smoothly along the respective crown narrow groove lengths so that the crown narrow grooves are curved convexly toward one side in the tire circumferential direction.

10. The tire according to claim 1, wherein
the first middle transverse grooves are the first middle transverse grooves disposed in the outboard middle land region and the first middle transverse grooves disposed in the inboard middle land region which are inclined in the same direction with respect to the tire axial direction at an angle θ1 in a range of 15 to 30 degrees, and
the second middle transverse grooves include the second middle transverse grooves disposed in the outboard middle land region and inclined with respect to the tire axial direction in the same direction as the first middle transverse grooves at an angle θ2 with respect to the tire axial direction which is smaller than the angle θ1 of the first middle transverse grooves.

11. The tire according to claim 1, wherein
the length in the tire axial direction of the first middle transverse grooves disposed in the outboard middle land region is in a range from 30% to 45% of the width in the tire axial direction of the outboard middle land region,
the length in the tire axial direction of the second middle transverse grooves disposed in the outboard middle land region is in a range from 30% to 45% of the width in the tire axial direction of the inboard middle land region, and
distances in the tire axial direction from the longitudinal sipe to the end on the longitudinal sipe side of each of the first middle transverse grooves and the second middle transverse grooves are in a range from 3.0 to 5.0 mm.

12. The tire according to claim 1, wherein
the outboard shoulder land region and the inboard shoulder land region are each provided with shoulder sipes extending across the respective shoulder land regions,
the distance in the tire circumferential direction between
the sipe end on the shoulder circumferential groove side of each of the shoulder sipe disposed in the outboard shoulder land region, and
the groove end on the shoulder circumferential groove side of adjacent one of the second middle transverse grooves in the outboard middle land region
is not more than 10% of a pitch length in the tire circumferential direction between the second middle transverse grooves.

13. A tire comprising:
a tread portion provided with four circumferential grooves extending continuously in the tire circumferential direction to axially divide the tread portion into five land regions,
the four circumferential grooves including two shoulder circumferential grooves, and two crown circumferential grooves therebetween,
the five land regions including two shoulder land regions between the two shoulder circumferential grooves and tread edges, two middle land regions between the shoulder circumferential grooves and the crown circumferential grooves, and one crown land region between the two crown circumferential grooves,
wherein each of the two middle land regions is provided with
a longitudinal sipe extending continuously in the tire circumferential direction,
first middle sipes each extending from the adjacent crown circumferential groove and terminated within the middle land region without being connected to the longitudinal sipe therein, and
second middle sipes extending from the adjacent shoulder circumferential groove and terminated within the middle land region without being connected to the longitudinal sipe therein, and
each of the two shoulder land regions is provided with shoulder transverse grooves extending from the adjacent tread edge and terminated within the shoulder land region,
wherein
the tire has a mounting position on a vehicle specified such that the tread edges are an outboard tread edge to be positioned away from a center of a vehicle body and an inboard tread edge to be positioned closer to the center of the vehicle body, whereby
said two shoulder land regions are an outboard shoulder land region extending axially inwardly from the outboard tread edge, and an inboard shoulder land region extending axially inwardly from the inboard tread edge, and
said two middle land regions are an outboard middle land region adjacent to the outboard shoulder land region, and an inboard middle land region adjacent to the inboard shoulder land region,
wherein
the width in the tire axial direction of the outboard shoulder land region is greater than the width in the tire axial direction of the outboard middle land region which is greater than the width in the tire axial direction of the crown land region which is greater than the width in the tire axial direction of the inboard middle land region which is greater than the width in the tire axial direction of the inboard shoulder land region.

14. The tire according to claim 13, wherein
each of the first middle sipes is provided, at its both edges on both sides in the tire circumferential direction, with first chamfers extending to a ground contacting top surface of the middle land region where said each of the first middle sipes is disposed, and
each of the second middle sipes is provided, at its both edges on both sides in the tire circumferential direction, with second chamfers extending to a ground contacting top surface of the middle land region where said each of the second middle sipes is disposed.

15. The tire according to claim 13, wherein
the width in the tire axial direction of the outboard shoulder land region is between 101% and 107% of the width in the tire axial direction of the crown land region, and
the width in the tire axial direction of the inboard shoulder land region is in a range from 93% to 99% of the width in the tire axial direction of the crown land region.

16. The tire according to claim 15, wherein the crown land region is provided with crown narrow grooves or alternatively crown sipes extending across the entire width of the crown land region.

* * * * *